(12) United States Patent
Akiyama et al.

(10) Patent No.: US 6,383,676 B1
(45) Date of Patent: May 7, 2002

(54) POLYMER ELECTROLYTE FUEL CELL DEVICE

(75) Inventors: Yukinori Akiyama, Ibaraki; Shigeru Sakamoto, Ota; Takahiro Isono; Takaaki Matsubayashi, both of Hirakata; Yasuo Miyake, Ora-gun; Ikuo Yonezu; Koji Nishio, both of Hirakata, all of (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 09/512,372

(22) Filed: Feb. 25, 2000

(30) Foreign Application Priority Data

Mar. 1, 1999 (JP) ............................. 11-052391

(51) Int. Cl.[7] ......................... H01M 8/10; H01M 8/06
(52) U.S. Cl. ............................. 429/30; 429/17
(58) Field of Search ..................... 429/17, 30, 33

(56) References Cited

U.S. PATENT DOCUMENTS 4,902,586 A * 2/1990 Wertheim ................ 429/17 X
5,736,026 A * 4/1998 Patel et al. ............... 429/17 X

FOREIGN PATENT DOCUMENTS

EP 911899 * 4/1999
JP 07-94200 A 4/1995
JP 11-040179 A 2/1999
WO WO 95/22179 * 8/1995

OTHER PUBLICATIONS

Translation of Japanese 11–040179 (Akiyama et al), Feb. 1999.*

Translation of Japanese 07–094200 (Iwasa et al), Jul. 1995.*

* cited by examiner

Primary Examiner—Stephen Kalafut
(74) Attorney, Agent, or Firm—Kubovcik & Kubovcik

(57) ABSTRACT

The invention provides a polymer electrolyte fuel cell device 1 comprising at least one fuel cell 10 having an anode, a cathode and a polymer electrolyte membrane provided between the anode and cathode, a combustion unit 3, a fuel gas pipe 4 for introducing therethrough the unreacted portion of a fuel gas discharged from the fuel cell 10 into the combustion unit 3, and an oxidizer gas supply manifold 2 for supplying oxidizer gas discharged from the combustion unit 3 to the cathode. By partly consuming the oxygen contained in an oxidizer gas supplied from outside, the combustion unit 3 burns the unreacted fuel gas and burns the impurities contained in the oxidizer gas. This feature prevents the polymer electrolyte membrane from drying, affords a high cell voltage without impairment and enables the device to achieve a higher overall efficiency than in the prior art.

4 Claims, 4 Drawing Sheets

POLYMER ELECTROLYTE FUEL CELL DEVICE

FIELD OF THE INVENTION

The present invention relates to polymer electrolyte fuel cells which comprise an anode, a cathode and a polymer electrolyte membrane provided between the anode and cathode and which is adapted to generate electric power by supplying a fuel gas containing hydrogen to the anode and an oxidizer gas to the cathode.

BACKGROUND OF THE INVENTION

Attention has been directed in recent years to fuel cells having a high energy conversion efficiency and producing no harmful substance by an electricity generating reaction. Polymer electrolyte fuel cells which operate at a low temperature of not higher than 100° C. are known as such fuel cells.

FIG. 4 shows the electricity generating principle of polymer electrolyte fuel cells. A fuel cell 50 is fabricated by arranging an anode 55 and a cathode 56 at opposite sides of a polymer electrolyte membrane 54 of ionically conductive solid high polymer, and further arranging a fuel chamber 57 and an oxidizer chamber 58 at opposite sides of the arrangement. The anode 55 and the cathode 56 are interconnected by an external circuit 59.

The hydrogen $H_2$ contained in the fuel gas supplied to the fuel chamber 57 is separated into hydrogen ions $H^+$ and electrons $e^-$ at the anode 55. The hydrogen ions $H^+$ migrate through the polymer electrolyte membrane 54 toward the cathode 56, while the electrons $e^-$ flow through the external circuit 59 toward the cathode 56.

At the cathode 56, the oxygen $O_2$ contained in the oxidizer gas supplied to the oxidizer chamber 58 reacts with the hydrogen ions $H^+$ and the electrons $e^-$, producing water $H_2O$.

In this way, the cell in its entirety produces water from hydrogen and oxygen and generates an electromotive force.

Since the single fuel cell 50 is small in electromotive force, a plurality of fuel cells 50 are usually connected to one another in series to provide a polymer electrolyte fuel cell device.

For example, FIG. 3 shows a fuel cell device 5 of the polymer electrolyte type which comprises a plurality of fuel cells 50 each in the form of a flat plate and connected in series as fitted to one another into an assembly. The fuel cells 50 connected in series are supplied with hydrogen gas or like fuel gas and air or like oxidizer gas for the fuel cells 50 to generate electric power and deliver the power to the outside.

Each fuel cell 50 of the device 5 is formed with a plurality of fuel gas channels (not shown) extending vertically and a plurality of oxidizer gas channels 53 extending horizontally.

The fuel cell 50 disposed at one end of the device has a fuel gas inlet 51a, while the fuel cell 50 disposed at the other end thereof has a fuel gas outlet 52a. The fuel cells 50 other than these end cells 50 are each formed with a fuel gas supply through bore 51 and a fuel gas discharge through bore 52.

By fitting the fuel cells 50 to one another, the fuel gas inlet 51a and the fuel gas supply through bores 51 are held in communication with one another to form a fuel gas supply passageway, and the fuel gas discharge through bores 52 and the fuel gas outlet 52a are held in communication with one another to form a fuel gas discharge passageway.

The fuel cell device 5 of the polymer electrolyte type is further provided with an oxidizer gas supply manifold 6 on the side thereof where the oxidizer gas channels 53 are exposed for supplying the oxidizer gas to the channels 53.

The manifold 6 has, for example, an opening facing downward and also an opening facing this side, such that the oxidizer gas taken in through the downward opening is sent into the oxidizer gas channels 53.

With the fuel cell device 5 described, the fuel gas is fed to the fuel gas inlet 51a as indicated by a solid-line arrow in the drawing, distributed to the fuel gas channels formed in each fuel cell 50 via the fuel gas supply passageway and subjected to an electricity generating reaction while flowing down these channels. The portion of the fuel gas remaining unreacted and reaching the fuel gas discharge through bores 52 after flowing through the fuel gas channels flows through the fuel gas discharge passageway provided by the bores 52 and is discharged to the outside from the fuel gas outlet 52a as indicated in a solid-line arrow in the drawing.

On the other hand, the oxidizing gas is taken in from the downward opening of the manifold 6 as indicated by broken-line arrows in the drawing, sent into the oxidizer gas channels 53 through the side opening and subjected to the electricity generating reaction while flowing through the channels 53. The portion of the oxidizing gas remaining unreacted and reaching the outlets of the channels 53 after flowing through the channels 53 is discharged to the outside from the outlets as indicated by broken-line arrows.

However, the fuel cell device 5 has the problem that during the generating operation, the water content of the polymer electrolyte membranes 54 decreases to result in reduced ionic conductivity, rendering the cells no longer serviceable as such.

Accordingly we have filed a patent application on a polymer electrolyte fuel cell wherein unreacted fuel gas and unreacted oxidizer gas are subjected to a combustion reaction, and the resulting water is supplied to a polymer electrolyte membrane to wet the membrane (JP-A No. 40179/1999).

This fuel cell nevertheless has the problem that the oxidizer gas supplied to the oxidizer chamber contains organic impurities such as kerosene and methanol, permitting the impurities to reach the surface of the cathode and inhibit the electrode catalytic reaction, lowering the cell voltage.

Accordingly, a fuel cell is proposed which has an air electrode to be supplied with clean air obtained by burning air by a combustion catalytic device for removing impurities from the air (JP-A No. 94200/1995).

However, the proposed fuel cell has the problem of being low in overall efficiency since the fuel gas remaining unreacted for power generation is discarded to the outside without being reused.

SUMMARY OF THE INVENTION

An object of the present invention is to provide a polymer electrolyte fuel cell device which comprises a polymer electrolyte membrane prevented from drying and which affords a high cell voltage without impairment and achieves a higher overall efficiency than in the prior art.

The present invention provides a polymer electrolyte fuel cell device which comprises at least one fuel cell 10 having an anode 15, a cathode 16 and a polymer electrolyte membrane 14 provided between the anode and the cathode for causing the fuel cell 10 to generate electric power by supplying a fuel gas containing hydrogen to the anode 15 and supplying an oxidizer gas to the cathode 16. The fuel cell device is characterized by introducing, into a combustion unit 3, the unreacted portion of the fuel gas discharged from the fuel cell 10 and the whole amount of the oxidizer gas to be fed to the cathode 16 to burn the unreacted fuel gas and burn the impurities contained in the oxidizer gas by partly consuming the oxygen contained in the oxidizer gas, and supplying the oxidizer gas discharged from the combustion unit 3 to the cathode 16.

With the fuel cell device of the invention, the unreacted portion of a fuel gas discharged from the fuel cell 10 is supplied to the combustion unit 3, and an oxidizer gas is supplied from outside to the unit 3.

In the combustion unit 3, the hydrogen contained in the unreacted fuel gas and the oxygen contained in the oxidizer gas undergo a combustion reaction to produce water. The impurities contained in the oxidizer gas also undergo a combustion reaction, whereby the impurities are decomposed into water and carbon dioxide. The oxidizer gas to be supplied to the combustion unit 3 contains oxygen in an amount required for the combustion reactions and an electricity generating reaction.

Accordingly, the combustion unit 3 discharges an oxidizer gas which contains water, oxygen and carbon dioxide gas. The oxidizer gas is supplied to the cathode 16, permitting the water contained in the gas to penetrate into the polymer electrolyte membrane 14 and providing the oxygen for the electricity generating reaction. The carbon dioxide supplied to the cathode 16 is discharged to the outside, along with the portion of the oxidizer gas remaining unreacted, without contributing to the generation of power and without producing any adverse effect on the operation of the fuel cell.

In the fuel cell device embodying the invention, the oxidizer containing water is fed to the cathode 16, permitting the water to penetrate into the polymer electrolyte membrane 14 as stated above and thereby preventing the membrane from drying.

Since the oxidizer gas as made free from the impurities by decomposition is supplied to the cathode 16, the impurities present in the oxidizer gas are unlikely to lower the cell voltage unlike the conventional fuel cells.

Furthermore, the unreacted fuel gas is supplied to the combustion unit 3 for reuse, whereby a higher overall efficiency is achieved than in the prior art wherein the unreacted fuel gas is discarded.

A fuel cell has been proposed in which outside air and unreacted hydrogen are supplied to a catalytic combustion device, and the combustion air available from the combustion device is supplied as admixed with outside air to an air electrode (JP-A No. 73911/1997). Since the mixture of the combustion air and outside air is thus supplied to the air electrode, the proposed fuel cell has the likelihood that the impurities in the outside air will lower the cell voltage.

With the fuel cell device of the invention, on the other hand, the oxidizer gas to be supplied to the cathode is free from impurities. This eliminates the likelihood of the impurities lowering the cell voltage.

Stated specifically, the combined volume of the oxidizer gas and the unreacted fuel gas to be supplied to the combustion unit 3 has a hydrogen gas concentration by volume of at least 4.0 vol. % to not higher than 10 vol. %.

If the hydrogen gas is supplied to the combustion unit 3 in an amount smaller than is necessary, the combustion reaction between the hydrogen in the unreacted fuel gas and the oxygen in the oxidizer gas, and the combustion reaction between the impurities in the oxidizer gas and the oxygen therein will proceed insufficiently, failing to fully moisten the oxidizer gas to be fed to the cathode 16 and to effectively decompose the impurities. If an excess of hydrogen gas is supplied, on the other hand, the oxygen in the oxidizer gas to be supplied to the combustion unit 3 is almost entirely consumed by the combustion reactions, reducing the amount of oxygen to be fed to the cathode 16.

Accordingly, it is desired that the concentration of hydrogen by volume be in the foregoing range.

Further stated specifically, the combustion unit 3 is adapted to activate the combustion reactions of the unreacted fuel gas and the impurities with a catalyst.

When thus adapted specifically, the unreacted fuel gas and the oxidizer gas come into contact with a combustion catalyst 32, which activates the combustion reaction between the hydrogen in the unreacted fuel gas and the oxygen in the oxidizer gas, and the combustion reaction between the impurities in the oxidizer gas and the oxygen therein, consequently fully moistening the oxidizer gas to be fed to the cathode 16 and decomposing the impurities more effectively.

With the fuel cell device of the polymer electrolyte type according to the present invention, the oxidizer gas containing water and made free from impurities by decomposition is supplied to the cathode to prevent the polymer electrolyte membrane from drying while enabling the device to give the desired cell voltage without impairment. With the unreacted fuel gas reused, the device attains a higher overall efficiency than those of the prior art.

DETAILED DESCRIPTION OF EMBODIMENT

Figure 1:
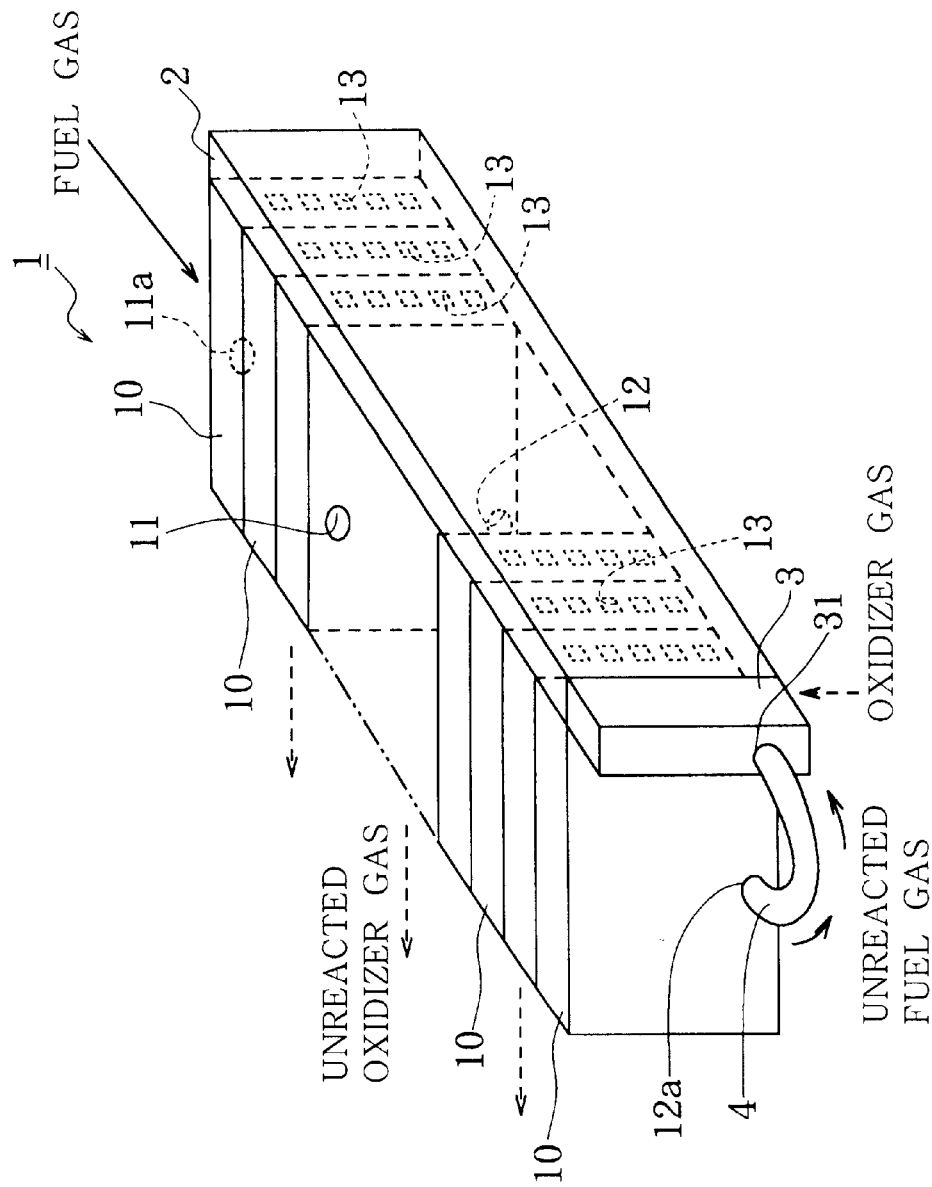
FIG. 1 is a perspective view showing the appearance of a polymer electrolyte fuel cell device of the invention.

An embodiment of the invention will be described below with reference to the drawings concerned.

A fuel cell device 1 of the polymer electrolyte type embodying the invention comprises a plurality of fuel cells 10 each in the form of a flat plate and connected in series as fitted to one another into an assembly. The fuel cells 10 connected in series are supplied with hydrogen gas or like fuel gas and air or like oxidizer gas for the fuel cells 10 to generate electric power and deliver the power to the outside.

The fuel cell device 1 is provided on one side of the arrangement of the fuel cells 10 with a manifold 2 for supplying the oxidizer gas to the fuel cells 10. The oxidizer gas supply manifold 2 has at one side thereof a combustion unit 3. The arrangement of fuel cells 10 and the combustion unit 3 is interconnected by a fuel gas pipe 4.

Each fuel cell 10 of the device 1 is formed with a plurality of fuel gas channels (not shown) extending vertically and a plurality of oxidizer gas channels 13 extending horizontally.

The fuel cell 10 disposed at one end of the device has a fuel gas inlet 11a, while the fuel cell 10 disposed at the other end thereof has a fuel gas outlet 12a. The fuel cells 10 other than these end cells 10 are each formed with a fuel gas supply through bore 11 and a fuel gas discharge through bore 12.

By fitting the fuel cells 10 to one another, the fuel gas inlet 11a and the fuel gas supply through bores 11 are held in communication with one another to form a fuel gas supply passageway, and the fuel gas discharge through bores 12 and the fuel gas outlet 12a are held in communication with one another to form a fuel gas discharge passageway.

The fuel gas pipe 4 has a base end communicating with the fuel gas outlet 12a of the end fuel cell 10 and an outer end communicating with a fuel gas inflow hole 31 formed in the combustion unit 3. Unreacted fuel gas discharged from the fuel gas outlet 12a is sent into the fuel gas pipe 4 and sent into the combustion unit 3 through the pipe 4.

The combustion unit 3 has an opening facing downward for taking in the oxidizing gas.

The combustion unit 3 further has an opening facing laterally toward the manifold 2. The manifold 2 has an opening opposed sideways to the combustion unit 3. The opening of the combustion unit 3 and that of the manifold 2 are in communication with each other, such that the oxidizer gas to be obtained from the combustion unit 3 as will be described below can be fed to the manifold 2.

The combustion unit 3 has a honeycomb structure with wall surfaces which are formed with a combustion catalyst layer (not shown) and define flow channels for passing gases therethrough. The catalyst layer is formed from a material containing at least one element selected, for example, from among Pt, Ru, Pd, Ni, Au and Rh.

The oxidizer gas supply manifold 2 has a side opening facing the fuel cells 10 for feeding therethrough the oxidizer gas supplied from the combustion unit 3 to the oxidizer gas channels 13.

With the fuel cell device 1 of the invention, the fuel gas is fed to the fuel gas inlet 11a as indicated by a solid-line arrow in the drawing, distributed to the fuel gas channels formed in each fuel cell 10 via the fuel gas supply passageway and subjected to an electricity generating reaction while flowing down these channels. The portion of the fuel gas remaining unreacted and reaching the fuel gas discharge through bores 12 after flowing through the fuel gas channels flows through the fuel gas discharge passageway and is sent into the fuel gas pipe 4 from the fuel gas outlet 12a and introduced into combustion unit 3 via the fuel gas inflow hole 31 thereof.

On the other hand, the oxidizer gas is taken in from the downward opening of the combustion unit 3 as indicated by a broken-line arrow in the drawing. The oxidizer gas contains organic impurities such as kerosene and methanol.

The oxidizer gas taken into the combustion unit 3 through its downward opening and the unreacted fuel gas flowing into the unit 3 through the fuel gas pipe 4 come into contact with the catalyst layer (not shown) to undergo the combustion reaction to be described below, humidifying the oxidizer gas and decomposing the organic impurities in the oxidizer gas.

The oxidizer gas available from the combustion unit 3 is fed to the manifold 2, sent into the oxidizer gas channels 13 through the side opening of the manifold 2 and subjected to an electricity generating reaction while flowing through the channels 13. The portion of the oxidizing gas remaining unreacted and reaching the outlets of the channels 13 after flowing through the channels 13 is discharged to the outside from the outlets as indicated by broken-line arrows.

Figure 2:
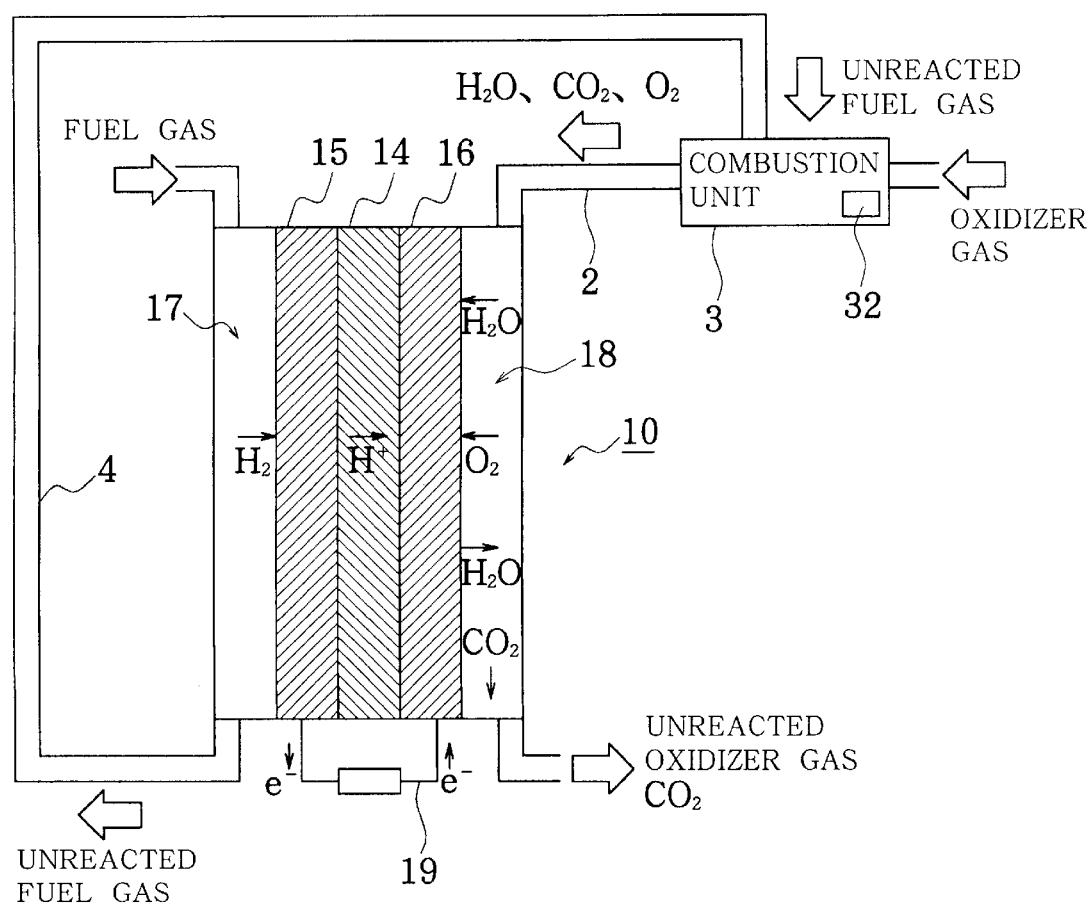
FIG. 2 is a diagram for illustrating the electricity generating reaction and combustion reactions in the fuel cell device.
Figure 3:
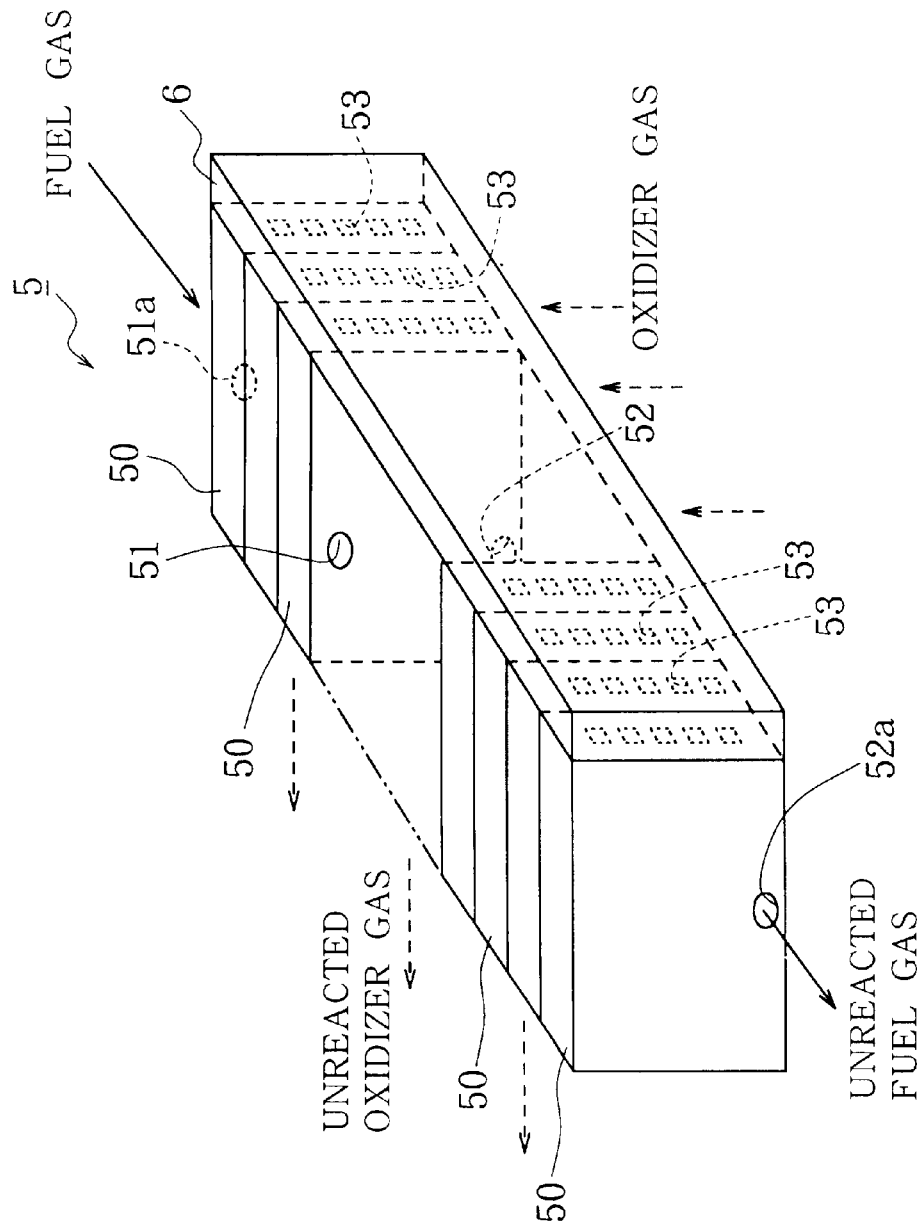
FIG. 3 is a perspective view showing the appearance of a conventional polymer electrolyte fuel cell device.
Figure 4:
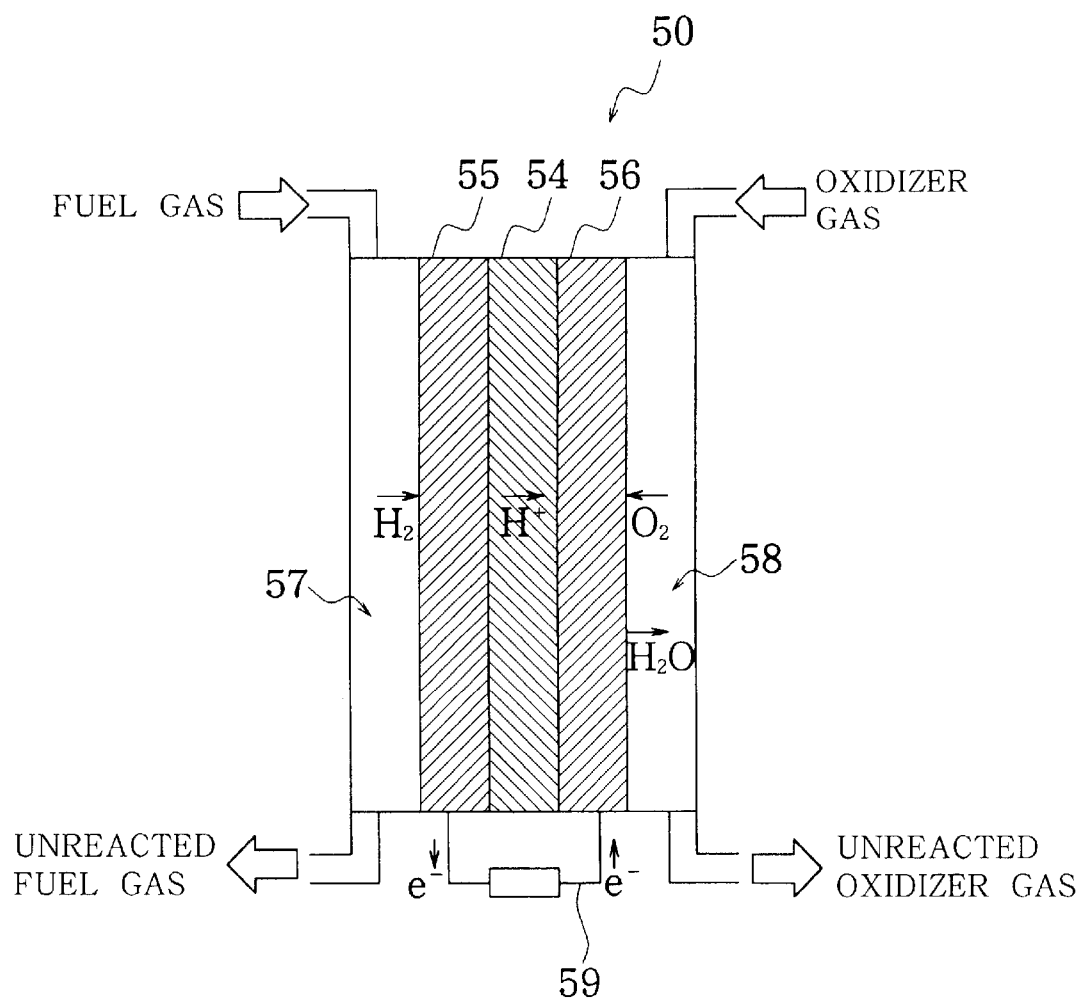
FIG. 4 is a diagram for illustrating the electricity generating principle of a conventional fuel cell.

The electricity generating reaction and the combustion reactions in the fuel cell device 1 of the polymer electrolyte type will be described in detail with reference to FIG. 2.

As illustrated, the fuel cell 10 is fabricated by arranging an anode 15 and a cathode 16 at opposite sides of a polymer electrolyte membrane 14 of ionically conductive solid high polymer, and further arranging a fuel chamber 17 and an oxidizer chamber 18 at opposite sides of the arrangement. The anode 15 and the cathode 16 are interconnected by an external circuit 19.

The fuel chamber 17 and the combustion unit 3 are held in communication with each other by the fuel gas pipe 4, and the combustion unit 3 and the oxidizer chamber 18 by the oxidizer gas supply manifold 2.

The hydrogen $H_2$ contained in the fuel gas supplied to the fuel chamber 17 is separated into hydrogen ions $H^+$ and electrons $e^-$ at the anode 15. The hydrogen ions $H^+$ migrate through the polymer electrolyte membrane 14 toward the cathode 16, while the electrons $e^-$ flow through the external circuit 19 toward the cathode 16.

At the cathode 16, the oxygen $O_2$ contained in the oxidizer gas supplied to the oxidizer chamber 18 reacts with the hydrogen ions $H^+$ and the electrons $e^-$, producing water $H_2O$.

In this way, the cell in its entirety produces water from hydrogen and oxygen and generates an electromotive force.

The portion of the fuel gas supplied to the fuel chamber 17 and remaining unreacted with the oxygen $O_2$ contained in the oxidizer gas is fed to the combustion unit 3 through the fuel gas pipe 4.

In the combustion unit 3, the unreacted fuel gas and the oxidizer gas c come into contact with the $H_2$ contained in the unreacted fuel gas and the oxygen $O_2$ contained in the oxidizer gas are subjected to a combustion reaction, which produces water $H_2O$. The organic impurities contained in the oxidizer gas and the oxygen $O_2$ contained in the oxidizer gas also undergo a combustion reaction, whereby the organic impurities are decomposed into water $H_2O$ and carbon dioxide $CO_2$. The catalyst layer 32 provided in the interior of the combustion unit 3 activates these combustion reactions to fully burn the hydrogen and organic impurities. The oxidizer gas fed to the combustion unit 3 contains the oxygen $O_2$ required for the electricity generating reaction and combustion reactions.

Accordingly, the combustion unit 3 provides an oxidizer gas containing water $H_2O$, oxygen $O_2$ and carbon dioxide $CO_2$.

The oxidizer gas thus obtained is fed to the oxidizer chamber 18 by way of the manifold 2, permitting the water $H_2O$ to pass through the cathode 16 and penetrate into the polymer electrolyte membrane 14 while allowing the oxygen $O_2$ to be used for the electricity generating reaction as described above. The carbon dioxide $CO_2$ supplied to the oxidizer chamber 18 is discharged to the outside along with the unreacted portion of oxidizer gas without contributing to the generation of power, exerting no adverse influence on the characteristics of the fuel cell.

With the fuel cell device 1 of the present embodiment, the oxidizer gas containing water as described above is fed to the oxidizer chamber 18, and the water penetrates into the polymer electrolyte membrane 14 through the cathode 16, whereby the membrane 14 can be prevented from drying.

Since the oxidizer gas made free from organic impurities by decomposition is fed to the oxidizer chamber 18, the organic impurities present in the oxidizer gas are unlikely to reach the cathode 16 and inhibit the electrode catalytic reaction, hence no likelihood of lowering the cell voltage.

The unreacted fuel gas discharged from the fuel chamber 17 is supplied to the combustion unit 3 for reuse, consequently enabling the fuel cell to achieve an improved overall efficiency than those of the prior art wherein the unreacted fuel gas is discarded. conducted to substantiate the advantage of the present invention.

Fabrication of Fuel Cells

A platinum catalyst as supported by a carbon powder was mixed with 20% of each of a Nafion solution and polytetrafluoroethylene (PTFE) to prepare a catalyst composition, carbon paper was coated with the catalyst composition and the coated paper was made into an anode and cathode (each in the form of a square measuring 5 cm in each side, 200 μm in thickness). A polymer electrolyte membrane of perfluorocarbonsulfonic acid (square, 7 cm in each side) was sandwiched between the anode and the cathode, and the assembly was hot-pressed under the conditions of 150° C., 50 kg/cm$^2$ and 60 sec to join the layers to one another. The electrode unit thus prepared was assembled into a fuel cell.

Measurement of Cell Voltage

The fuel cell was operated under the following conditions and checked for voltage.

[Conditions]

| | |
|---|---|
| Current density: | 0.5 A/cm$^2$ |
| Cell temperature: | 80° C. |
| Fuel utilization: | 40% |
| Oxidant (air) utilization: | 40% |

Experimental Results

Table 1 shows the measurements obtained for the fuel cells tested.

TABLE 1

| | Hydrogen concn. (vol %) | Cell voltage (mV) | Combustion catalyst | Impurities |
|---|---|---|---|---|
| Example 1 | 0 | 605 | Yes | Yes |
| Example 2 | 0.5 | 520 | No | " |
| Example 3 | 0.8 | 550 | " | " |
| Example 4 | 1.0 | 580 | " | " |
| Example 5 | 2.0 | 590 | " | " |
| Example 6 | 4.0 | 605 | " | " |
| Example 7 | 7.0 | 610 | " | " |
| Example 8 | 9.0 | 610 | " | " |
| Example 9 | 10.0 | 600 | " | " |
| Example 10 | 11.0 | 585 | " | " |
| Example 11 | 12.0 | 565 | " | " |
| Example 12 | 15.0 | 500 | " | " |
| Example 13 | 20.0 | 420 | " | " |
| Example 14 | 22.0 | 380 | " | " |
| Example 15 | 7.0 | 625 | Yes | " |
| Comp. Ex. 1 | — | 390 | No | " |
| Comp. Ex. 2 | — | 600 | " | No |

In Examples 1 to 15, an air mixture prepared by admixing impurities with air and further admixing a fuel exhaust gas therewith was fed to the cathode. The impurities were admixed with air in the same amount as the amount of kerosene evaporated when air was sprayed onto kerosene having a temperature of 40° C. In Examples 1 to 15, the fuel exhaust gas was admixed in varying amounts to alter the hydrogen concentration, and the cell voltage was measured at the different hydrogen concentrations. The hydrogen concentration is defined as the concentration in volume of the hydrogen gas in the combined volume of the air containing the impurities admixed therewith and the fuel exhaust gas.

In Examples 1 and 15, the air mixture obtained by admixing the impurities with air and further admixing the fuel exhaust gas therewith was brought into contact with a combustion catalyst and thereafter fed to the cathode.

In Comparative Example 1, air having the impurities admixed therewith but containing no fuel exhaust gas was fed to the cathode without bringing the air into contact with the combustion catalyst.

In Comparative Example 2, air only was fed to the cathode without admixing the impurities and the fuel exhaust gas with the air and without contacting the air with the combustion catalyst.

The results given in Table 1 reveal that the cell voltage obtained was higher in Examples 6 to 9 than in Comparative Examples 1 and 2. High cell voltages of at least 610 mV were obtained especially in Examples 7, 8 and 15. This advantage is thought attributable to the combustion reaction between the hydrogen gas contained in the fuel exhaust gas and the oxygen gas contained in the air which reaction produced water in an amount sufficient to wet the polymer electrolyte membrane, and also to the effective decomposition of the impurities present in the air by the combustion reaction thereof with the oxygen gas. In Examples 6 to 9 and Example 15, the difference between the concentration in volume of the oxygen gas in the air before the addition of the fuel exhaust gas and the concentration in volume of the air containing the fuel exhaust gas added thereto was up to 5 vol. %. The above advantage, therefore, appears attributable also to the fact that oxygen was supplied to the cathode in an amount sufficient to the electricity generating reaction.

The results described above indicate that the hydrogen concentration should preferably be in the range of 4.0 vol. % to not higher than 10 vol. %.

Further a comparison between Example 7 and Example 15 reveals that Example 15, wherein the air mixture was contacted with the combustion catalyst, afforded a higher cell voltage than Example 7, wherein the air mixture was not contacted with the Combustion catalyst. Presumably this is attributable to the activation of the combustion reaction by the catalyst.

In cell voltage available, Examples 2 to 5 and Examples 10 to 14 were higher than Comparative Example 1 but lower than Comparative Example 2. This is thought attributable to the fact that Examples 2 to 5 were low in hydrogen concentration, were therefore insufficient in the combustion reaction between the hydrogen gas contained in the fuel exhaust gas and the oxygen gas contained in the air, and were also insufficient in the combustion reaction between the impurities contained in the air and the oxygen gas therein. On the other hand, Examples 10 to 14 were lower presumably because the oxygen gas contained in the air was almost entirely consumed by the combustion reaction to reduce the amount of oxygen to be supplied to the cathode.

What is claimed is:

1. A polymer electrolyte fuel cell device comprising at least one fuel cell (10) having an anode (15), a cathode (16) and a polymer electrolyte membrane (14) provided between the anode and the cathode for causing the fuel cell (10) to generate electric power when a fuel gas containing hydrogen is supplied to the anode (15) and an oxidizer gas is supplied to the cathode (16); and a combustion unit (3) into which an unreacted portion of the fuel gas discharged from the fuel cell (10) and a whole amount of the oxidizer gas to be fed to the cathode (16) are introduced to burn the unreacted fuel gas and burn impurities contained in the oxidizer gas by partly consuming the oxygen contained in the oxidizer gas, and from which oxidizer gas is discharged and supplied to the cathode (16).

2. The polymer electrolyte fuel cell device according to claim 1 wherein the combustion unit (3) includes a gas supply opening through which oxidizer gas is taken in from outside; a fuel gas pipe (4) through which unreacted fuel gas discharged from the fuel cell (10) is introduced into the combustion unit (3); and an oxidizer gas supply manifold (2) from which oxidizer gas discharged from the combustion unit (3) is supplied to the cathode (16).

3. A polymer electrolyte fuel cell device according to claim 1 wherein the combined volume of the oxidizer gas and the unreacted fuel gas to be supplied to the combustion unit (3) has a hydrogen gas concentration by volume of at least 4.0 vol. % to not higher than 10 vol. %.

4. The polymer electrolyte fuel cell device according to claim 1 wherein the combustion unit (3) includes a catalyst for activating the combustion reactions of the unreacted fuel gas and impurities.

* * * * *